(12) United States Patent
Krantz et al.

(10) Patent No.: US 7,181,855 B2
(45) Date of Patent: Feb. 27, 2007

(54) METHODS AND DEVICES FOR ENHANCING INTENSITY OF ON-SURFACE LINES CAST BY LASER LINE PROJECTORS OR THE LIKE

(75) Inventors: Norman L. Krantz, San Jose, CA (US); Larry Miller, Paso Robles, CA (US)

(73) Assignee: Zircon Corporation, Campbell, CA (US)

( * ) Notice: Subject to any disclaimer, the term of this patent is extended or adjusted under 35 U.S.C. 154(b) by 77 days.

(21) Appl. No.: 11/005,453

(22) Filed: Dec. 6, 2004

(65) Prior Publication Data

US 2006/0117584 A1 Jun. 8, 2006

(51) Int. Cl.
G01C 15/00 (2006.01)
G03B 21/26 (2006.01)
G02B 5/04 (2006.01)

(52) U.S. Cl. ............... 33/286; 33/DIG. 21; 33/227; 359/837; 353/28

(58) Field of Classification Search ............... 33/286, 33/277, 228, DIG. 21; 359/837; 353/28
See application file for complete search history.

(56) References Cited

U.S. PATENT DOCUMENTS

| | | | | |
|---|---|---|---|---|
| 3,179,797 A | * | 4/1965 | Franck | 362/223 |
| 4,483,618 A | * | 11/1984 | Hamar | 356/400 |
| 4,656,562 A | * | 4/1987 | Sugino | 362/552 |
| 4,908,948 A | * | 3/1990 | Gormley | 33/276 |
| 5,052,112 A | * | 10/1991 | MacDonald | 33/263 |
| 5,095,629 A | * | 3/1992 | Klemer et al. | 33/293 |
| 5,572,183 A | * | 11/1996 | Sweeney | 340/332 |
| 5,818,633 A | * | 10/1998 | Perchak | 359/565 |
| 5,838,431 A | * | 11/1998 | Hara et al. | 356/138 |
| 6,005,719 A | * | 12/1999 | Rando | 359/629 |
| 6,087,645 A | * | 7/2000 | Kitajima et al. | 250/203.1 |
| 6,259,241 B1 | * | 7/2001 | Krantz | 324/67 |
| 6,295,738 B1 | * | 10/2001 | Risch | 33/700 |
| 6,452,731 B1 | * | 9/2002 | Schorning | 359/742 |
| 6,587,184 B2 | * | 7/2003 | Wursch et al. | 356/4.01 |
| 6,735,879 B2 | * | 5/2004 | Malard et al. | 33/286 |
| 6,798,574 B2 | * | 9/2004 | Kim | 359/566 |
| 6,810,598 B2 | * | 11/2004 | Boys | 33/528 |
| 6,833,962 B2 | * | 12/2004 | Bergen | 359/626 |
| 6,839,974 B1 | * | 1/2005 | Hitchcock | 33/473 |
| 6,914,930 B2 | * | 7/2005 | Raskin et al. | 372/109 |
| 7,003,890 B2 | * | 2/2006 | Kavounas | 33/286 |
| 7,086,163 B1 | * | 8/2006 | Makotinsky | 33/286 |
| 2005/0097765 A1 | * | 5/2005 | Sorensen et al. | 33/666 |
| 2006/0196059 A1 | * | 9/2006 | Berto | 33/286 |

* cited by examiner

*Primary Examiner*—Diego Gutierrez
*Assistant Examiner*—Amy R. Cohen
(74) *Attorney, Agent, or Firm*—MacPherson Kwok Chen & Heid LLP; Gideon Gimlan

(57) ABSTRACT

Given a situation where a projected laser line appears to have terminated or faded as it intersects with a work-surface (e.g., a wall), a fan-out redirecting means is used to capture and redirect energy radiating above and parallel to, or radiating away from the given work-surface area, where the captured energy is from a line projector mounted to the surface. The radiation capturing and redirecting means aims the captured energy at a greater angle towards the work-surface so that the redirected light is thereafter reflected back to a user to give the perception that a line of enhanced intensity or reborn existence is being created on the work-surface or on a reflective overlayer placed against the work-surface. The radiation capturing and redirecting means may include one or both of optically refractive means and optically reflective means (e.g., lens and mirrors) for performing the capturing and/or redirecting functions.

65 Claims, 6 Drawing Sheets

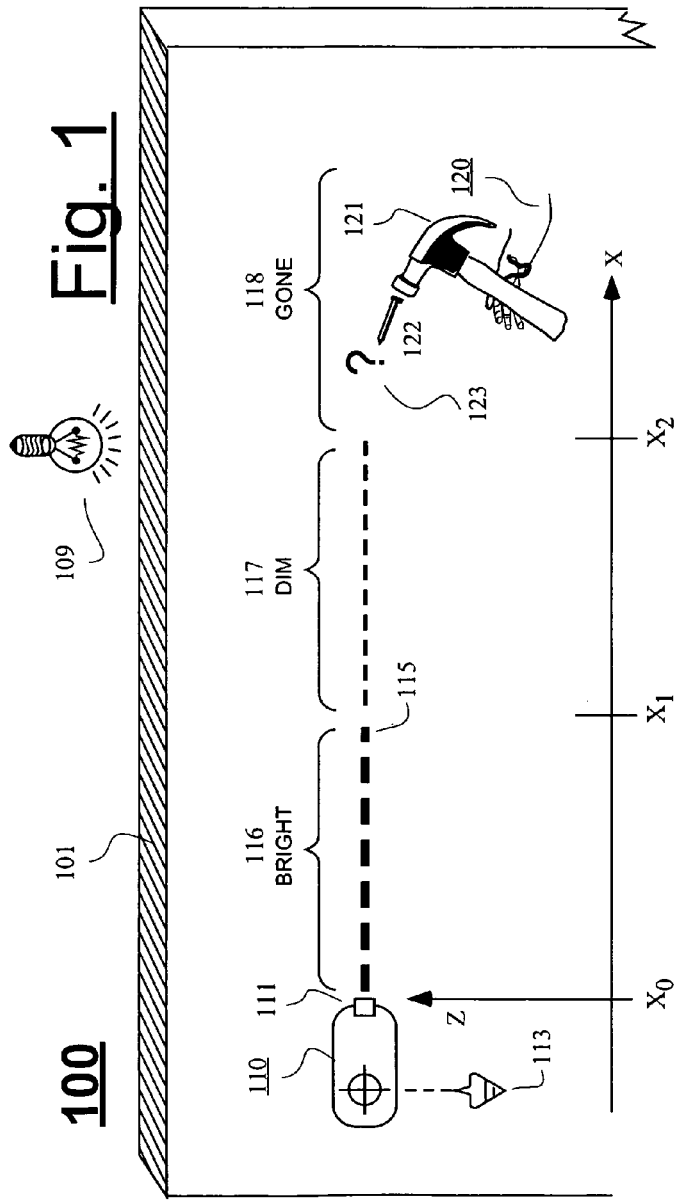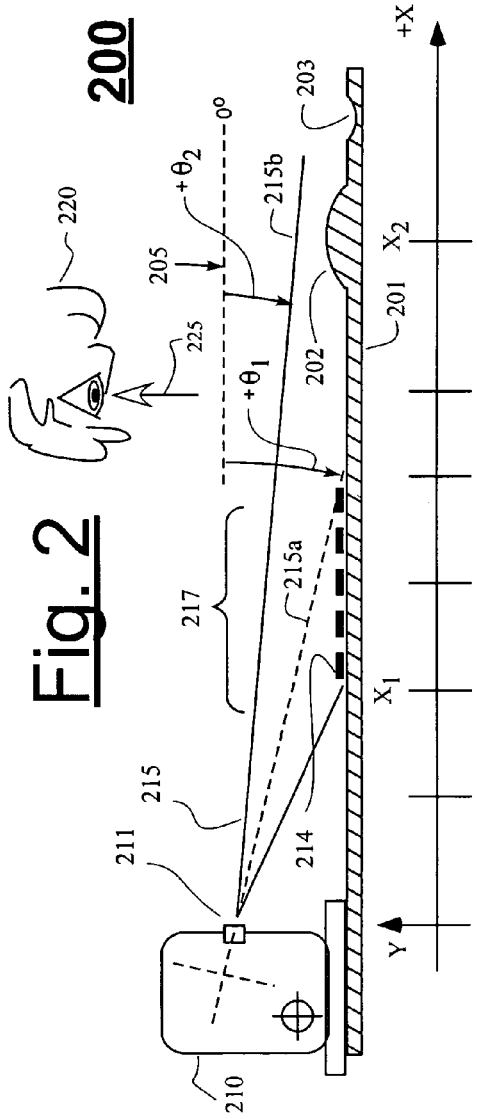

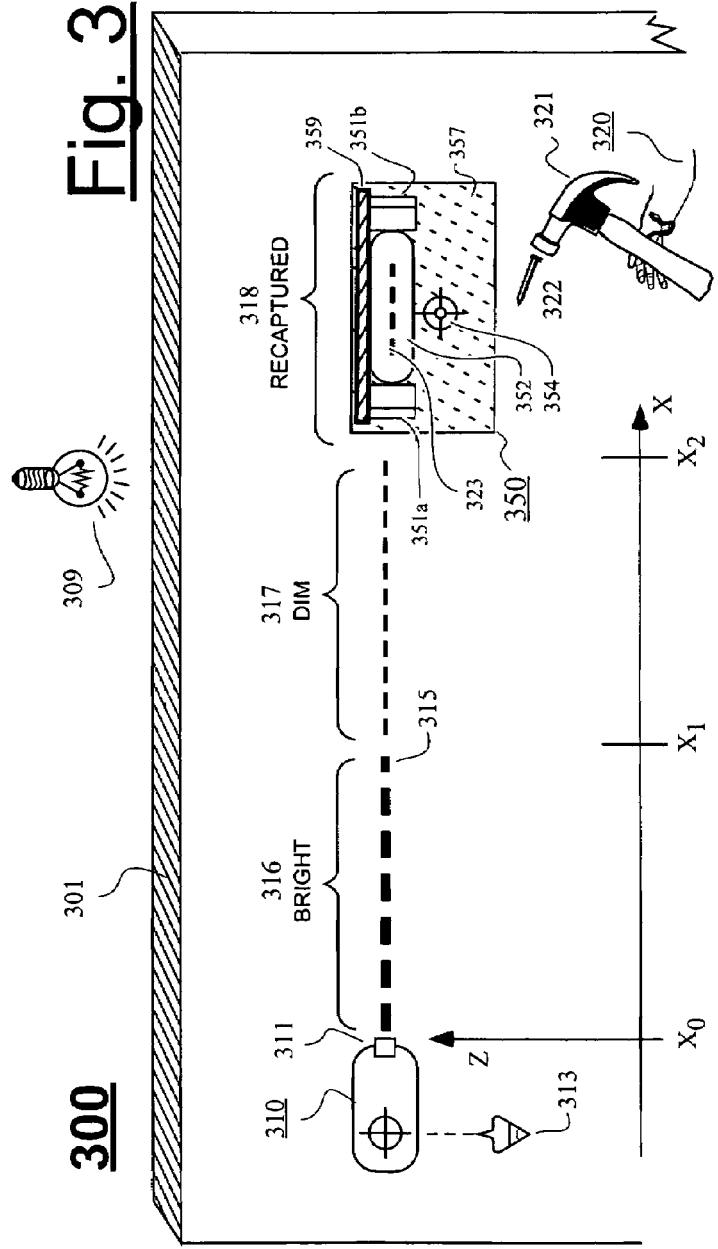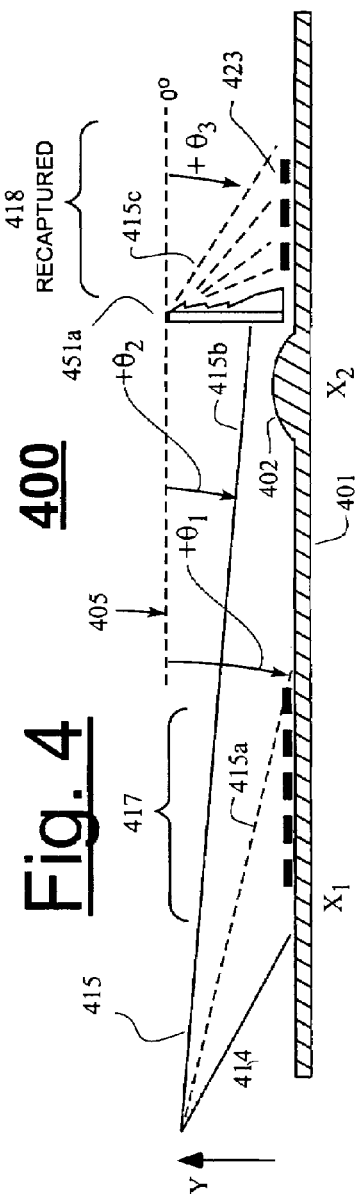

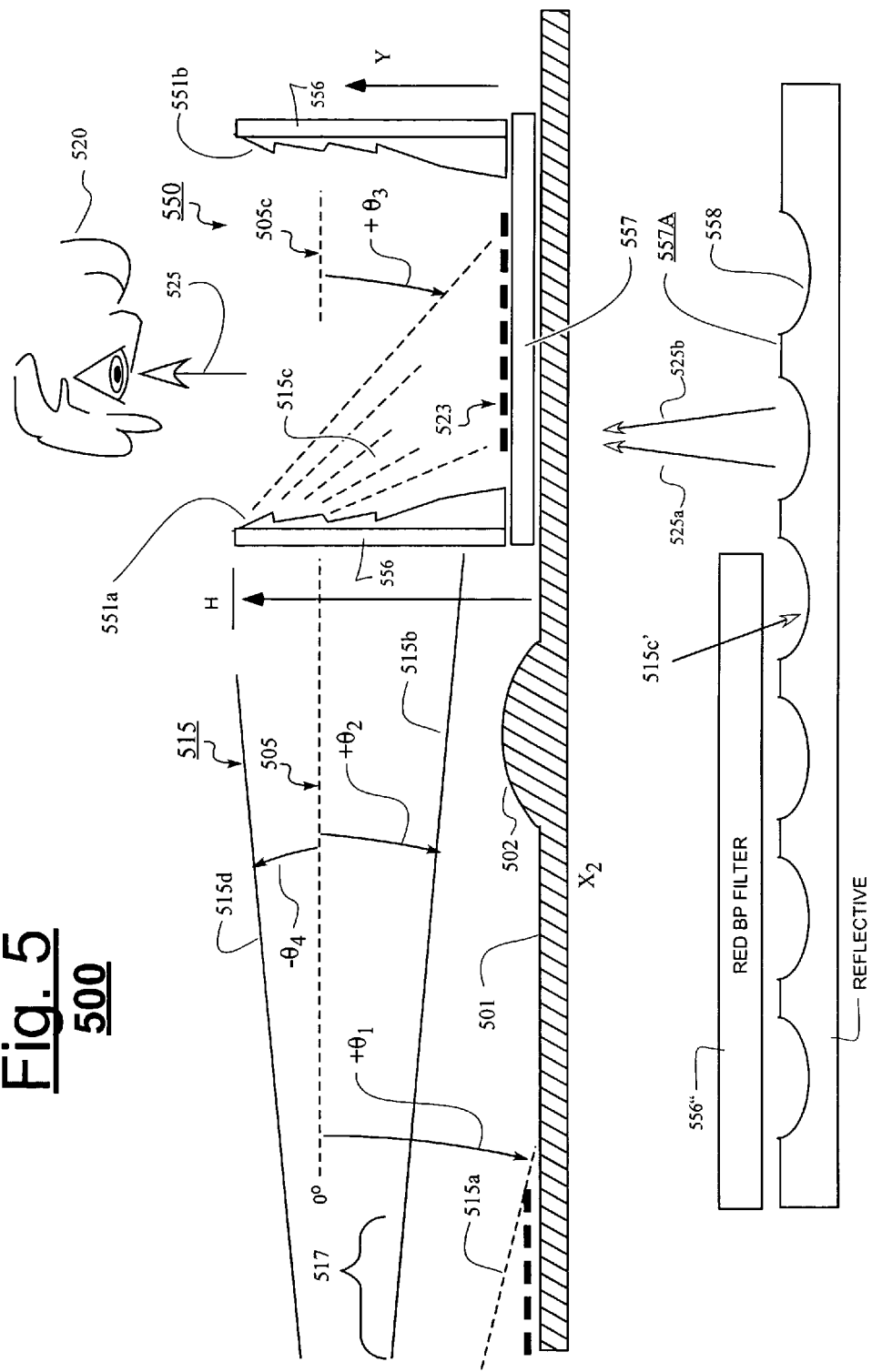

600

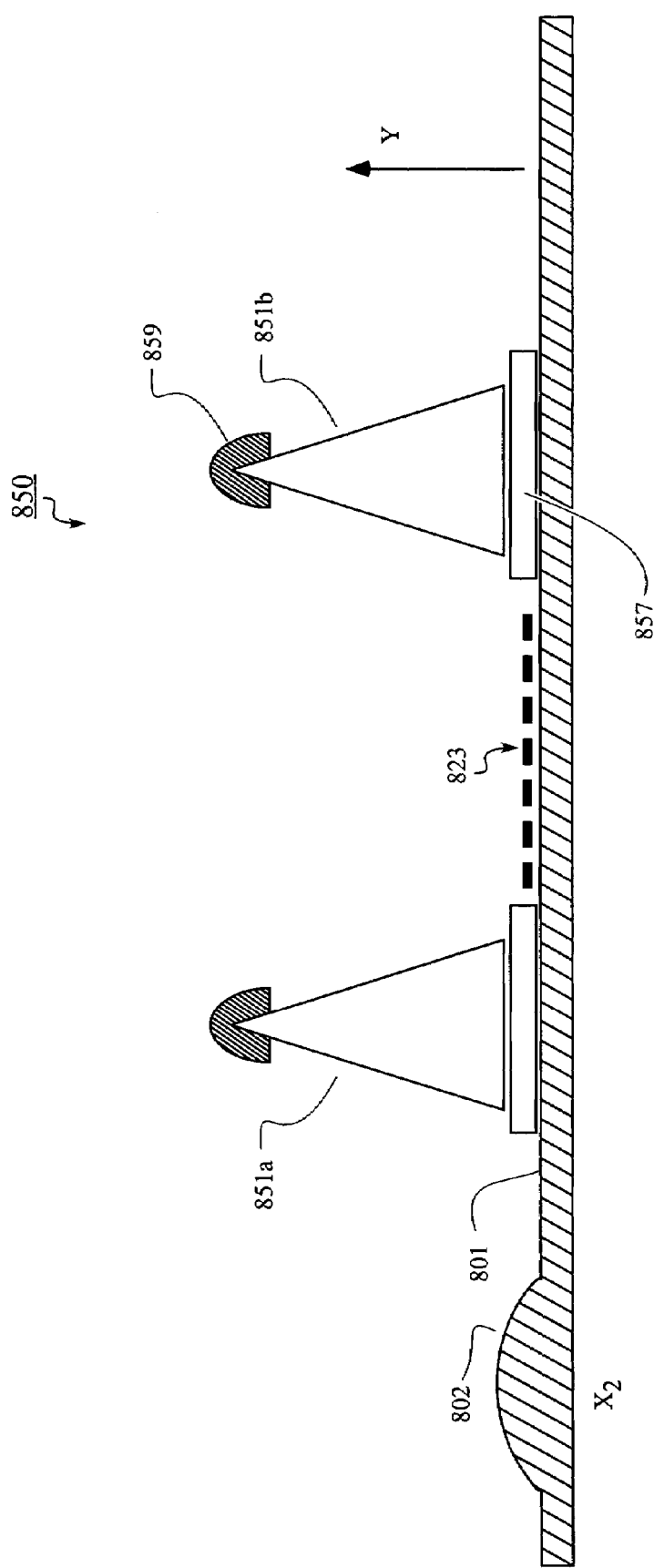

METHODS AND DEVICES FOR ENHANCING INTENSITY OF ON-SURFACE LINES CAST BY LASER LINE PROJECTORS OR THE LIKE

FIELD OF DISCLOSURE

The invention relates generally to laser line, or other lighted line projectors such as used in the construction industry for projecting straight lines along walls or other objects. The disclosure relates more specifically to enhancements which increase the effective length and/or intensity of the projected lines along a surface.

DESCRIPTION OF RELATED ART

Laser line projectors have been a boon to the construction industry, helping workmen to layout straight and leveled or plumbed lines along walls or other objects. Many designs for laser line projectors exist, ranging from very complicated and expensive ones that mount on large tripods, generate a plurality of very precise beams of light in different directions and automatically level and precisely square up their respective beams; to very simple and inexpensive ones where the user is expected to manually orient the projector while supporting the projector on a work-surface (typically a planar wall of a room) so that a fan-out of low power output light from the projector is aimed roughly parallel to, and oriented level against the work-surface. A portion of the fanned-out light energy intersects with the work-surface (wall) and reflects back to the user so that the user perceives a straight line as having been being projected across the work-surface.

A problem persists in the use of such manually aimed, small and portable projectors. It is difficult to form a projected line of uniform beam intensity (reflected intensity) along a long wall, say one that is about 10 to 30 feet or longer. Government regulations limit the maximum power output of manually aimed projectors to about 5 milliwatts (5 mW, this maximum also known as Class IIIA) and this limitation in turn limits the useful length of the projector's output line. The reason for the power limitation is that users can accidentally point the output laser beam directly toward an eye and injure themselves or others.

In the conventional, manually aimed and wall-mounted laser line projectors, light intensity is often tailored with optics so that the most intense part of the outwardly projected fan-out will be aimed at slightly less than parallel (about 2 degrees or less off the parallel) toward the wall with which the fan-out will intersect. The intersection of the fan-out with the wall creates the appearance of the wall-illuminating line. A fresnel lens or the like is used to fan the rays outwardly. In a relatively common design, the most intense part of the projected fan-out is aimed at a relatively shallow angle off the parallel, towards the farthest away part of the generated line (about 6–10 feet from the projector) while less intense portions of the fan-out are aimed at greater angles off the parallel. Users typically note that the intensity of the illuminated line on the wall paradoxically appears to be strongest near its far end (about 6–10 feet away from the projector housing) and that unexplainably weakens as one gets closer to the projector. Shortly beyond the point where the most intense beam intersects with the wall, the illuminated line appears to rapidly weaken and thereafter disappear. The reason for this is that the users are actually seeing the effects of the fan-out optics. The optics often sacrifice some near end and far end intensity in order to maximize the intensity at the planned end point of the projected line. The fan-out of light rays from the projector actually continues beyond the perceived end-point, but that further fan-out is dimmer and angled such that it typically does not strike the wall and/or such that it does not reflect strongly back to the user. In fact there is often light energy that runs parallel to the wall or angles away from the wall so that it does not naturally intersect with the wall. Users will generally not see this part of the radiant energy unless there is an orthogonal wall near the wall on which the projector mounts.

A problem which arises with such fanout-generated lines is that sometimes workmen wish to work on a wall region that is beyond the planned end point of a given line projector. The workmen discover to their dismay that the line appears to have run out of steam, so to speak, disappeared before reaching the desired work area. A conventional solution is to move the projector closer to the desired work area. This involves remounting the projector on the wall at a closer position and leveling it again, as well as optionally realigning it to work that has been done earlier (i.e., earlier marked and/or drilled spots that were worked when the projector was at its original, wall-mounted position). Such remounting can be cumbersome and time consuming.

SUMMARY

In accordance with one aspect of the present invention, a fan-out redirecting means is used to capture and redirect energy radiating above and parallel to, or radiating away from a desired work-surface area, where the captured energy is from a line projector mounted to the surface. The radiation capturing and redirecting means aims the captured energy at a greater angle towards the work-surface so that the redirected light is thereafter reflected back to a user to give the perception that a line of enhanced or reborn intensity is being created on the work-surface or on a reflective overlayer placed against the work-surface.

More specifically, in one embodiment, a refractive means (e.g., a fresnel lens) of a given height is placed roughly perpendicular to a work-surface region so that light beams passing over, but not originally intersecting with the work-surface region are refracted and thereby redirected to intersect with the work-surface region. The user perceives an enhanced or amplified projection appearing on the work-surface region. The refractive means (e.g., fresnel lens) may be made of an inexpensive plastic such as clear or specially colored acrylic, and it may be mounted to a hand tool such as a studfinder or a handyman's ruler (e.g., a square). The user moves the hand tool about in the expected general area of extension of the projector's line, and an extended portion of the line appears to magically appear just beyond the refractive means. In an alternate embodiment, a reflective means (e.g., a fresnel mirror) may be used to fold the above-surface light energy towards the work-surface, in which case the extended portion of the projector's line appears to magically appear just before the location of the reflective means. Various combinations of refractive and reflective optics may be provided side-by-side or interdigitated with one another so as to provide respective redirection of non-intersecting radiation to instead intersect with, and reflect back from, the work-surface or an overlayer in an area before or after the optics of the projection enhancer.

Other aspects of the disclosure will become apparent from the below detailed description.

BRIEF DESCRIPTION OF THE DRAWINGS

The below detailed description section makes reference to the accompanying drawings, in which:

FIG. 1 is a perspective side view showing a work environment in which a projection enhancer in accordance with the invention can be used;

FIG. 2 is a cross sectional top view for explaining a number of reasons why a user may perceive a projected light line as having become very dim or discontinuous or to have disappeared from a portion of the work-surface on which the projector is mounted;

FIG. 3 is a perspective side view similar to FIG. 1 but showing the work environment after the projection enhancer has been introduced;

FIG. 4 is a cross sectional top view for explaining how a first embodiment of the projection enhancer operates;

FIG. 5 is a cross sectional top view for explaining how a second embodiment of the projection enhancer operates;

FIG. 8 is a cross sectional top view showing a fourth embodiment of a projection enhancer in accordance with the invention.

DETAILED DESCRIPTION

Figure 6:
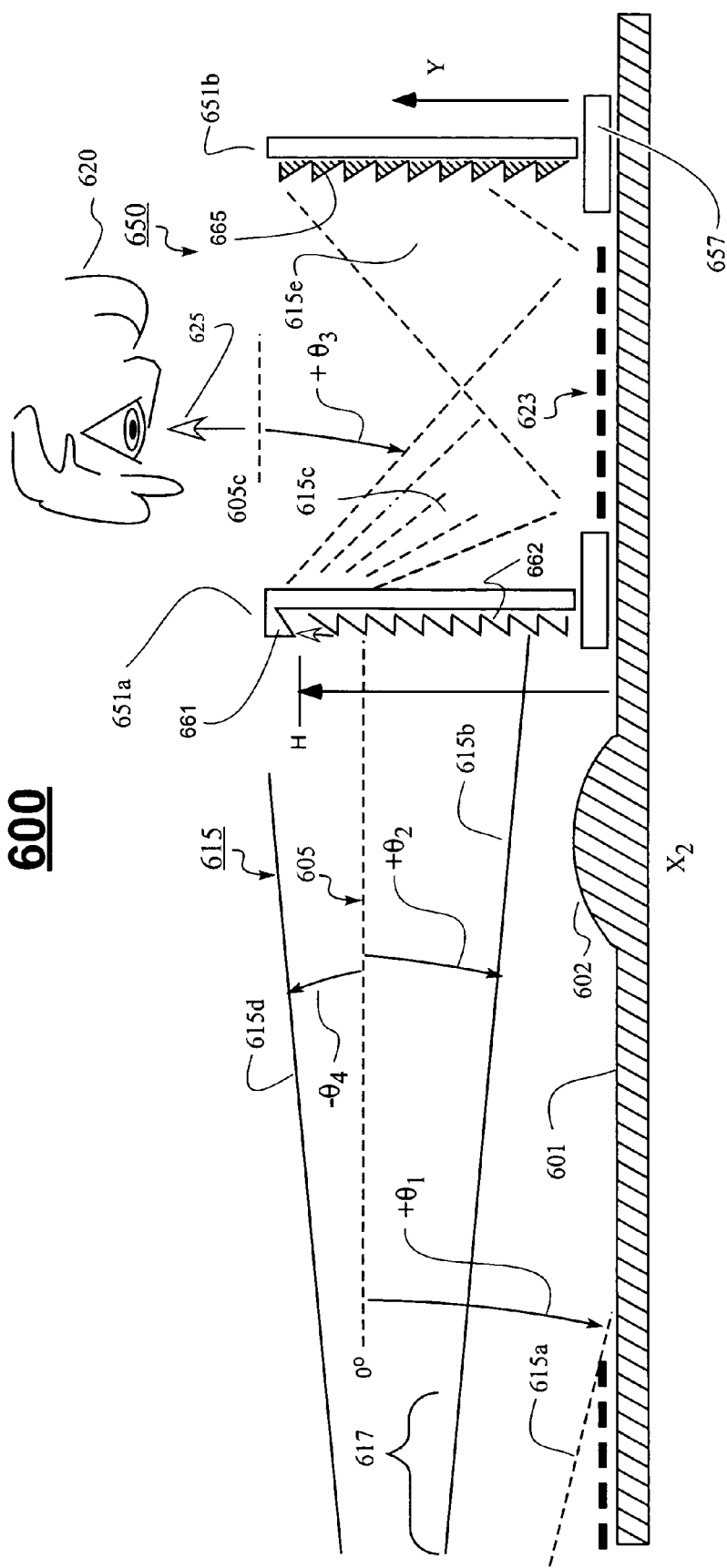
FIG. 6 is a cross sectional top view showing a third embodiment of the projection enhancer.

FIG. 1 is a perspective schematic diagram showing a first environment 100 which may benefit from the invention. The environment 100 includes a vertical wall 101 (work-surface) within a room lit by a ceiling-based illumination system (e.g., light bulb 109). A laser line projector 110 is mounted to the wall 101 at a first location, $X_0$. The projector 110 is designed to project an illuminated line 115 (or another type of light pattern, e.g., a linear array of dots) onto the adjacent wall surface 101 extending to predefined end point, roughly at position $X_2$. A plumbing means 113 may be included in projector 110 so that the projected line 115 can be aligned square to the gravitational force or at some other a pre-specified angle relative to the level or plumb condition. Typically, a bubble vial (not shown) is used instead of an actual plumb line 113. The illustrated plumb line and weight 113 are shown simply to provide a schematic indication of the manually or automatically calibrated casting angle of illumination line 115.

As a workman 120 (only the hand of the workman is shown) approaches the wall 101, the workman will note that part of the projected line 115 is relatively bright (e.g., section 116), part is dimmer (e.g., section 117), and then at some distance $X_2$ beyond the beam output port 111 of the projector, the line appears to disappear completely such as shown in section 118. Additionally, there may be other spots along the wall between $X_0$ and $X_2$ where the line appears to vanish temporarily. Specifics for where the projected line 115 appears brightest (e.g. between $X_0$ and $X_1$), where it appears to be dimmer (e.g. between $X_1$ and $X_2$) and where the planned end point $X_2$ occurs at which the projected line 115 appears to have run out of energy will vary from situation to situation and therefore exact numbers cannot be given. For purpose of example, position $X_2$ might be about 6 to 10 feet away from the light output port 111 of the projector 110.

In the illustrated example, the workman 120 wishes to work in the region 118 of the wall where the projected line 115 appears to have vanished. As part of the desired work operation, the workman may wish locate one or more points along a linear extension of line 115 where that linear extension is in the "gone" region 118. By way of example, the workman 120 may wish to make a pencil or other marking on the wall surface 101 where the marking is exactly in-line with the projected line image 115. The marking may be needed for laying out the locations of book shelf supports, wire conduits, pipes or other structures that are to be provided about the room 100 in an aesthetic and/or functionally optimized manner (e.g. structures that are level and/or plumb relative to gravity). Additionally or alternatively, the workman may wish to use a hand tool (e.g. a hammer or drill) 121 for driving a hole-making element 122 (e.g. a nail or a drill bit) through the wall 101 at a specific point along the extension of projected line image 115. However, since the desired location is within the vanished zone 118, it is difficult, if not impossible to manually determine exactly where the linear extension of line 115 would lie within the vanished zone 118. This uncertainty is indicated by the question mark symbol (?) at 123.

The conventional solution to this problem, as explained above, would be for the workman 120 to dismount the wall-mounted projector 110 from original position $X_0$ and to move it closer to the region 118 where the workman now wishes to operate (121/122). However, to do so, the workman often has to go through the cumbersome process of marking off at least two, if not more, re-alignment marks in the far region 117 to which the projector is to be moved. The workman has to dismount projector 110 from its original position ($X_0$), remount it at some new position (say at $X_1$), align the newly projected beam 115 to marks made in region 117, assure that the projector continues to remain in a desired angled (e.g., level) condition by using plumbing means 113 or an equivalent, and apply nails, adhesive tape or other means for mounting the projector 110 to the wall at its new position ($X_1$), all while the projector 110 remains properly aligned to the earlier marks and stays at the desired angle (e.g., relative to the plumb line 113). Finally the workman may resume the desired operation (121/122) in the previously-vanished zone 118 now that the projected line 115 extends into that previously-vanished zone 118. The remounting process can be cumbersome, time consuming and may introduce undesired errors. For example, if the remounting is repeated a number of times along an unusually long wall, an accumulating error, such as one in the vertical positioning of the projector 110 (along the Z axis) may unintentionally creep in with each remounting because the projected line 115 of a re-mounted projector may not be perfectly in-line with the earlier projection. Therefore, it is desirable to be able to avoid remounting the projector 110 and to still be able to perform the desired operation 121/122 in the vanished region 118.

Typically, when construction work (e.g., 121/122) is being done, a drywall and/or other sheet material forms the unfinished wall surface 101. These types of wall surfaces are neither perfectly planar nor plumb relative to gravity, nor are they exactly at 90 degrees or some other angle relative to other walls. Additionally, the wall materials may have bumps and depressions. They may be intentionally textured such that linear surface sections are not inherently present in the walls. Thus it is difficult to project a clean, continuous laser line 115 completely across such wall surfaces by using a parallel projecting, line projector 110. The bumps and/or depressions in the wall may cause the projected line to skip over various regions along its intended projection length $X_0$–$X_2$. Therefore, numerous instances may occur where the workman 120 is not exactly sure he is operating (121/122) exactly on a point lying on the pre-aligned and projected line 115.

Aside from the presence of bumps and/or there being an excessive distance (>$X_2$) between the projector and the current work area 118, other factors may come into play. The positioning and brightness of elements (e.g., light 109) in the room illuminating system may be such that they flood out parts of the projected laser line 115. Additionally, the wall surface 101 may have certain colorations which make it difficult for the workman to spot the location of the projected line 115 at those positions. For example the wall may have a green painted section on which a red laser line is to be shown, where the green paint absorbs strongly in the red wavelength region. In such dimmed laser line situations, the workperson 120 may have to strain excessively to spot the laser line 115. It is desirable to reduce the strain on the workman when he is trying to finding the correct location for performing a given wall operation (121/122). The invention is to be understood as being applicable not only to areas where the laser line 115 appears to have vanished completely, such as in region 118 of FIG. 1, but also to regions where a projected line 115 is dimmed (e.g. region 117) because of the existence of other illuminations (109) or of interfering wall colorations, textures, etc.

FIG. 2 is a top cross sectional view of an environment 200 similar to environment 100 of FIG. 1, where a vertical wall section 201 (shown in cross section) includes bumps such as 202 and/or depressions such as 203. A workman 220 (whose face is shown rotated 90°) is looking at the vertical wall 201 and is expecting to see a reflected light image 225 coming off the wall in a given work zone. The reflected light image 225 creates the impression that a projected line such as indicated by dashed line 214 extends across the wall 201.

FIG. 2 shows a line projector 210 having an output port 211 tilted at angle so that it produces a corresponding fan-out 215 of light beams (not all shown), where the fan-out 215 lies within a plane that intersects the wall 201. In one case, the intersecting edge 214 of the plane is leveled relative to gravity or is otherwise oriented at a desired angle relative to gravity. The intersection of this fan-out 215 with the wall surface 201 will generally produce some amount of image reflection 225 back to the eye of the workman 220 so that the workman sees a projected line 214 on the wall. The amount of reflection 225 may depend on the angle (e.g. +$\theta_1$) at which each given light ray (e.g., 215a) is projected relative to a hypothetical parallel 205 of the wall and towards the wall. The hypothetical parallel 205 is taken as being roughly parallel to the general wall surface 201. The amount of reflection 225 may also depend on the intensity of that projected light beam 215a, which intensity is determined by the output port optics 211 of the projector 210 as well as its internal laser or other light source. The amount of reflection 225 may also depend on the angle at which the workman 220 is facing a given work zone (e.g., 116, 117, 118) along the wall.

By way of example, the wall 201 may have a first wall region 217 where the off-parallel angle, +$\theta_1$, of the light beams intersecting there is towards the wall and is relatively large. Beam intensity for region 217 can be relatively strong, and the wall surface itself can be relatively flat and parallel to the reference line 205 in region 217. As a result, the workman 220 will see a large amount of reflected light 225 coming off of wall region 217, thereby creating the impression that the projected line image 214 is strong in wall region 217. On the other hand, if another ray of light 215b has a comparatively smaller, off-parallel angle +$\theta_2$ directed to a position beyond distance $X_2$ and/or if the intensity of the projected light ray 215b is comparatively weak, the workman 220 will perceive the reflected light image 225 due to that light ray 215b as being much dimmer or as having vanished entirely. Moreover, if a given part of the light fan-out 215 is parallel to the wall, such as represented by dashed line 205 (0°) or angles away from the wall (a negative $\theta$), then clearly that parallel or angling away light ray will not strike the wall and no reflected light 225 will come back to the workman. Additionally, if there is a light-blocking bump 202 on the wall or a depression 203 which has a self-shading part, then clearly no light will strike just beyond the bump or at the beginning part of the depression and again the workman 220 will not see any reflected light 225 coming back to his eyes for those bumped 202 or depressed 203 parts of the wall 201. Thus it is seen that a number of different mechanism can cause the workman 220 to perceive the projected line 214 as having dimmed or completely vanished at various positions along the work-surface 201.

FIG. 3 is a perspective side view similar to FIG. 1 but showing the work environment 300 after a projection enhancer 350 in accordance with the invention has been introduced into wall region 318. The latter region 318 is where conventionally the projected laser line 315 would have vanished because the distance is greater than the designed end point distance, $X_2$ of the projector 310. As seen though, a visible and linear extension 323 of the projected line 315 now appears to have been resuscitated (brought back to life) or intensified within a recaptured image area (within aperture area 352) of what would have been a vanished-image region 318. Thanks to the presence of the projection enhancer 350, the workman 320 sees the extended line 323 and now knows exactly where to hammer in his nail 322 (or make a pencil mark, or drill a hole, etc.) so as to be in-line with projected line 315. In one embodiment, a cross-haired targeting indicator 354 is provided with a pinhole defined through its center on a base portion 357 of the projection enhancer 350. The targeting indicator 354 allows the workman 320 to apply a marker through, or insert a small nail into that pin hole at a predefined distance (e.g., ¼ inch) below the recaptured line extension 323.

The illustrated projection enhancer 350 has an aperture 352 defined through its base 357 so that the recaptured line projection 323 projects against the surface of the wall 301. In an alternate embodiment, part or all of the aperture 352 is closed and a corresponding part or all of the recaptured line projection 323 projects against the enlarged part of base 357.

The projection enhancer 350 includes a first energy capturing and redirecting means 351a provided at the left side of aperture 352. The projection enhancer 350 further includes a second energy capturing and redirecting means provided at the right side of aperture 352. In one embodiment, one or both of means 351a and 351b contain refractive optics as shall be further detailed shortly. In another embodiment, one or both of means 351a and 351b contain reflective optics as shall be further detailed shortly. To enhance the apparent intensity of the recaptured line projection 323, a light-blocking shroud 359 is optionally provided to extend over aperture 352 so as to block light from a ceiling light fixture such as 309. The shroud 359 may attach to the left and right light capturing and redirecting means 351a and 351b. In one embodiment, the shroud 359 is simply a darkened piece of rectangular plastic which can be domed or flat. Additional contrast improvement may be provided by adding yet another shroud (not shown) below the aperture 352 and attached to the bottoms of redirecting means 351a, 351b, but not blocking an associated fan-out of light belonging to line 315 from entering means 351a from the left or blocking another such fan-out from entering means 351b from the right. Additional contrast improvement may be provided by including optical band-pass filters (e.g., red-colored cellophane) to the redirecting means 351a and 351b, as will be better understood from the detailed discussion below.

FIG. 4 is a cross sectional top view for explaining how a first embodiment 400 of the projection enhancer operates. As already explained, part of the light fan-out 415 from the light projector (not shown) extends within a relatively shallow, positive angle, (e.g., between 0° to $+\theta_2$) below the wall-paralleling horizontal 405, and some of the fan-out 415 may actually extend at angles above the horizontal, in other words, angling away from the wall 401. (The away angles will be indicated as negative angles herein. See for example, $-\theta_4$ of FIG. 5.) An appropriately configured refracting optics, such as the illustrated fresnel lens 451a, is positioned to intercept this upper portion (e.g., between $+\theta_2$ to 0°, or even negative of 0°) of the light fan-out 415 and to redirect it at a greater positive angle, of $+\theta_3$ or more, so that the intercepted and redirected portion 415c of the fan-out is now directed to reflective region 423 of the wall 401. (In one embodiment, $+\theta_3$ is about 30° or greater, but less than 90°.) Dashed line 423 represents the reflected light image that reflects back to the user's eyes now that the captured light is redirected at the new angle $+\theta_3$ or more, towards the wall.

The upright fresnel lens 451a may be made of an appropriate plastic such an acrylic or of glass or of any other appropriate optical medium. The medium may be clear or may have desirable band-pass capabilities. In one embodiment, where the light source 311 in the projector outputs in the red range, the optical medium is colored red so it passes through the wavelength of the projector's light source while optionally blocking out other, potentially-interfering wavelengths. Of course, a more conventional, convex and non-fresnel lens may also be used for capturing and redirecting the light although such a more conventional lens will tend to be thicker and therefore more expensive than a fresnel embodiment. If the optical media of the lens is relatively soft and/or flexible, it may be protected and/or supported by a harder and/or more rigid plate made of glass, transparent plastic or another such material.

The invention need not be limited to merely refractive means (lens type means) for intercepting and redirecting, parallel or away-from-wall radiation back to the wall. Reflective means (e.g. mirrors) may be additionally or alternatively used for intercepting the offset-from-wall radiation (e.g., in the range between $+\theta_2$ to 0°, or even negative of 0°) and/or for redirecting the intercepted radiation so as to provide an enhanced image 423 of that intercepted radiation on the wall surface or on an alternate image projection screen (e.g., base 557 of FIG. 5).

FIG. 5 is a top cross sectional view of yet another embodiment 550 in illustrated environment 500. Here, two opposed and inwardly-facing fresnel lens 551a and 551b are shown mounted substantially perpendicular to a base support 557 of the enhancer 550. The base 557 is held against the wall or mounted to the wall 501 so that the fresnel lenses 551a and 551b will extend generally perpendicularly away from the wall to a predetermined height, H on their respective left and right sides. The height H may vary depending on application. For one set of embodiments, height H is in the range of approximately 0.5 inch to 1 inch, with the nominal value being about 0.75 inch. Clear or colored cover plates, 556 and 556' may be provided along the outer sides of the projection enhancer 550 for supporting and/or protecting the fresnel lens. If one or both of the cover plates, 556 and 556', are made of a colored plastic, they can function as contrast-enhancing bandpass filters for the wavelength used by the line projector (e.g. 310 of FIG. 3). For example, if a red laser is used, then the band pass filters 556, 556' will also be red-colored so as to block other wavelengths while letting through substantially most of the intercepted radiation (e.g., in the range between $+\theta_2$ to 0°, or even to $-\theta_4$) captured by height H.

The base 557 of the illustrated projection enhancer may be a rigid or flexible plate and it may be colored white or otherwise made reflective to further enhance the amount of energy that is reflected 525 towards the user's eyes 520. Thus, if the work surface 501 is colored with a complimentary color, say green to oppose the red used by the laser source, the wall would normally absorb most of the redirected light 515c. However the overlaid backing piece 557 can be contrastingly colored (e.g., white or red) to better reflect that light towards the users eyes as indicated by arrow 525. Thus the user 520 will see a clearer and better-contrasted version of the extended line projection 523 reflecting back (525) to his or her eye's.

In one embodiment, the backing 557 has a bottom layer 557A which is white or otherwise reflective and has parabolic reflective depressions 558 defined therein. The parabolic reflective depressions 558 better focus or concentrate the reflected light towards the user's eyes as is indicated by arrows 525a and 525b. Rather than seeing a solid but dimmer line, the user should perceive a series of brighter dots distributed across this light-concentrating backing 557A to represent the extended line projection 523. An optional second layer 556" may be overlaid on top of the reflective substrate 557A to function as a band pass filter (e.g., a red wavelength-passing filter) so as to provide yet better contrast. Redirected light 515c' easily passes in and then reflects back out through the band pass filter 556" while ambient light of other wavelengths is substantially reduced. Of course, these various enhancements (557A and/or 556") add to the overall costs of the projection enhancer 550, and their use may be justified, or not, depending on specific applications.

Note that the symmetrical structure shown in FIG. 5 allows the projected fan-out 515 to enter equivalently from either side, namely, from the left or from the right of the projection enhancer. It is therefore not necessary to turn the projection enhancer 550 around to intercept and redirect the incoming beam 515 depending on whether the projector is to the left or right of the enhancer. The enhancer 550 will work from either direction to project the redirected energy 515c towards backing surface 557.

FIG. 6 shows yet another embodiment, embodiment 650 structured in accordance with the invention and placed in corresponding environment 600. In this embodiment 650, the right side interceptor 651b comprises a series of angled mirrors 665 (a fresnel version of a 45 degree or otherwise angled conventional mirror). In a first variation, the left-side plastic lens 651a is not present. In such a case, the mirrors 665 alone capture the intercepted height H of the incoming beam fan-out 615 arriving from the left. The mirrors 665 redirect that intercepted light as indicated by path 615d to create the extended line image 623 between the mirrors 665 and the light source (the projector). This re-projected line image 623 is then reflected 625 from the wall 601 to the eyes of the user 620.

In yet another variation, only the refractive optics 651a on the left is present and the reflective optics 651b on the right is not present. In such a case, each of the 45 degree prisms 662 lined along backing support 661 bends the intercepted radiation of interception height H into triangular zone 615c to create the apparent projection 623. Once again this apparent project 623 is reflected from the wall 601 back to the user's eyes as indicated by 625. Note that in this embodiment, the angled faces of prisms 652 face outwards towards the projection source. A shroud 661 is provided at the top of the structure for preventing reflection from the angled face of the topmost 45 degree prism from being reflected back to the user's eyes. In one variation, shroud 661 includes a reflective mirror on its underneath side.

In yet another variation both the refractive portion 651a and the reflective portion 651b are present. Some of the intercepted light within height H is bent according to cone 615c towards the wall 601. Another portion of the incident light from incoming fan-out 615 is first reflected upwardly by the 45 degree angled faces of the multiple prisms 662 and then periscope-wise to the mirrors 665. More specifically, the upwardly reflected light portions in optics section 651a enters the horizontal bottom surfaces of the multiple prisms 662 and is then reflected within the prisms (by total internal reflection) towards the reflective redirecting structure 651b on the right side. The reflective structure 651b then reflects the prism-redirected light towards the wall 601 as triangular zone 615e so that the final image 623 becomes the summed combination of the refracted light 651c and the twice reflected light 615e. Redirecting structures 651a and 651b should be optically parallel to one another so that redirected energy portions 615c and 615e will lie in the same plane when structures 651a and 651b are optically perpendicular to the plane of incoming radiation 615. (In the latter case, the redirected energy portions 615c and 615e should also be aligned in-plane with the incoming radiation 615.) The user 620 should see a more enhanced version of the reconstructed line extension 623 due to the summing of redirected energy portions 615c and 615e and due to the fact that the reflected combination 625 spans a wider angle than would the reflected counterpart of just one of energy portions 615c and 615e.

The base portion 657 of projection enhancer 650 may have an aperture provided through it so that the reconstructed line image 623 reflects off of the actual wall surface 601. The base 657 may additionally have a slideable filter plate similar in structure to 557A of FIG. 5, where the slideable filter plate (not shown) slides into place between the illustrated parts of base 657 when it is desired to provide yet better contrast and reconstruction of the line extension 623 in cases where the incoming radiation 615 is comparatively weak or the room is flooded with a bright ambient light (e.g., 309 of FIG. 3 or from an open window).

Figure 7:
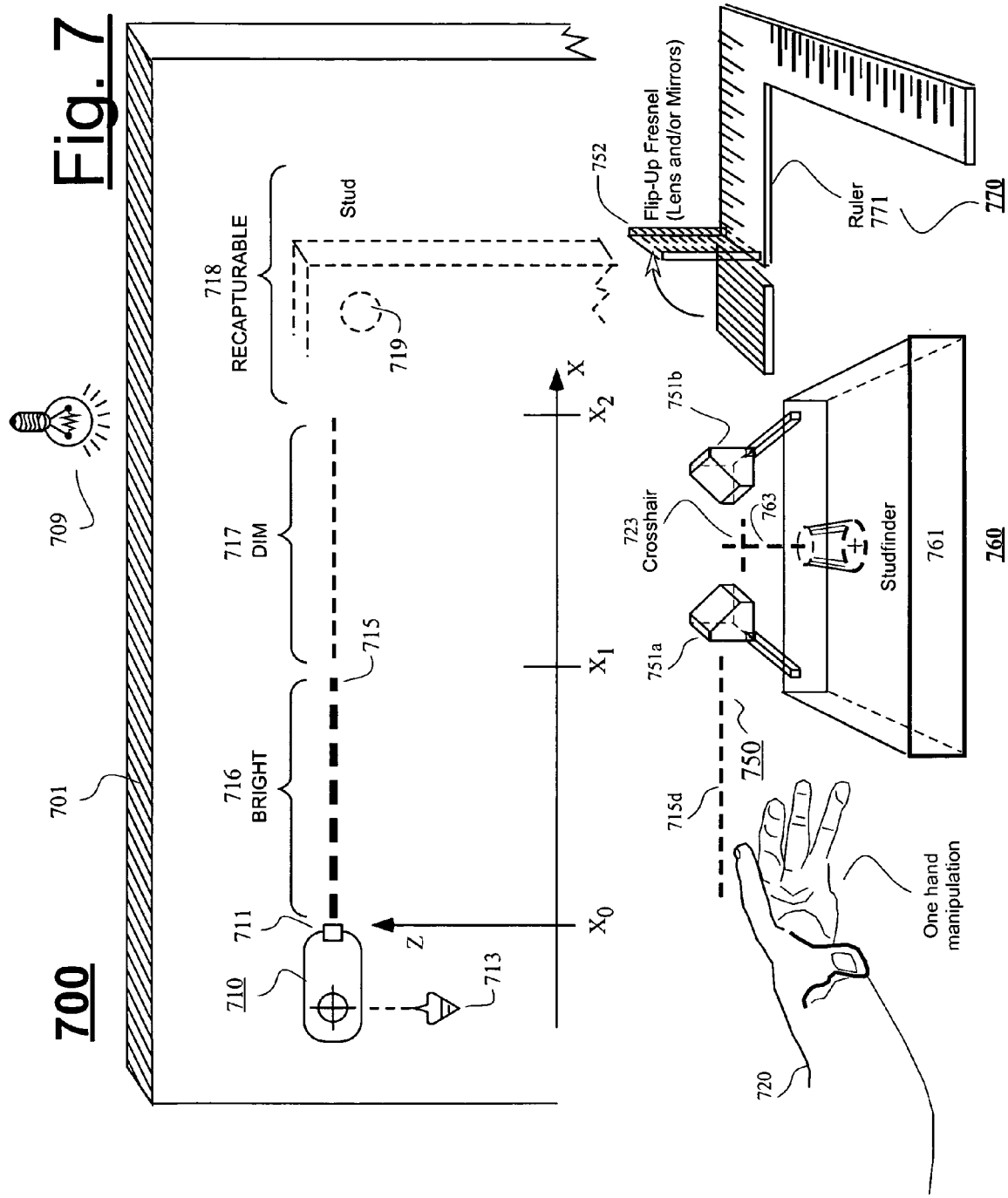
FIG. 7 is a perspective side view similar to FIG. 1 but showing how projection enhancers in accordance with the disclosure may be operatively coupled to hand-held tools such as scanners and rulers.

FIG. 7 shows yet further embodiments, 760 and 770, structured in accordance with the invention and placed in a corresponding work environment 700, where, environment 700 is similar to 100 of FIG. 1. Embodiment 760 comprises a scanner 761 which can scan for hidden features of wall 701. For example, the scanner can include a studfinder for detecting nails or other metallic objects 719 hidden beneath the surface of wall 701. Upon detection of such a hidden object, the scanner 761 projects a first light fan-out 763 to intersect with the wall at the position of the detected object 719. Embodiment 760 further comprises a projection enhancer 750 operatively coupled to the scanner 760 so that a user 720 can simultaneously move both the scanner 760 and the enhancer 750 with just one hand while searching against wall region 718 for one or a combination of both of a hidden and scanner-detectable object (e.g., nail head 719) and a linear extension or enhancement of laser line 715. If both are found in a same place, a crosshair image such as shown at 723 should appear. The horizontal line portion of the projected crosshair 723 results from the captured and redirected energy produced by plastic lens 751a from incoming radiation 715d. The vertical line portion of the projected crosshair 723 results from the scanner output beam 763.

The projection enhancer 750 may be fixedly attached to the scanner 760 or it may be removably clipped into the body of the scanner 760 or it may be slideably extendable out of the body of the scanner 760. The enhancer 750 may have just one refractive or reflective element (e.g., prismatic lens 751a alone) or it may have various combinations of such elements provided on both sides (e.g., counterfacing elements 751a and 751b). In one embodiment, each of counterfacing elements 751a and 751b is made of a clear plastic fashioned from a rectangular rod with one edge milled at about a 35 degree angle as shown. When both refractive and reflective redirecting elements are used, they may be provided side-by-side on a slidable support so the user can elect to use one or the other for redirecting the captured incoming radiation 715d either forward along its original direction of propagation or backwards. When both refractive and reflective redirecting elements are used, they may be alternatively provided as interdigitated elements so that half of the captured incoming radiation 715d is redirected forward and down along its original direction of propagation and the other half (roughly) is reflected and thus cast backwards. In such a case, the line extension (623) will appear on the work-surface on both sides of the projection enhancer having interdigitated refractive and reflective elements.

Working Example: A working example of embodiment 760 was constructed by taking stock, transparent square plastic rods (believed to be acrylic) having a side width of about 0.5 inch, milling one corner off at about 35°, polishing the milled surface and cutting off two pieces to thereby create the 7-surface structures as substantially shown at 751a and 751b. The 7-surface structures were glued in counterfacing relation, as substantially shown at 751a and 751b and also at 351a–351b in FIG. 3, to a clear plastic support plate such as 357 of FIG. 3. An aperture was defined through the support plate such as shown at 352 and a shadowing shroud made of a flexible dark plastic was glued to the 7-surface structures as is substantially shown at 359. The plastic support plate (357) was adhered to a wall scanner 761 (sometimes referred to as a studfinder) which emits a marking light 763 when a wall-hidden structure such a wooden stud is detected (e.g., via sensing of change in capacitive loading). The combination of scanner 761 and projection enhancer 751a–751b was moved about a vanished zone such as 118 of FIG. 1 and a resurrected laser line was observed such as shown at 323 in FIG. 3. Additionally, when a stud was present in the vicinity, a crosshair of projected lights was observed such as shown at 763 in FIG. 7. The crosshair 763 was generated with use of just one hand 720, thereby leaving the user's other hand free to mark the position of the crosshair 763 on the wall with a pencil or to drill a hole at that spot with the free hand (not shown). It is within the contemplation of the disclosure to have the wall scanner 761 be one with multiple or alternate sensing capabilities such as locating wall-hidden metal objects (e.g., via sensing of change in inductive loading) and/or wall-hidden electrical lines that carry predefined types of signals (e.g., via sensing of 60 Hz or other signal coupling).

For the other embodiment 770 shown in FIG. 7, the projection enhancer 752 may be constituted by a plate-like fresnel structure of refractive and/or reflective elements that pivotally attach to a marked ruler or square 771. The plate-like fresnel structure may removably clip onto the ruler body and/or may slideably move along it so that the enhanced line extension (623) appears on the ruler 771 itself or on a work-surface adjacent to the ruler. Once again, the projection enhancer 752 is operatively coupled to the ruler means 771 so that a user (720) can simultaneously move both the ruler 771 and the enhancer 752 with just one hand 720 while searching against wall region 718 for one or a combination of both of a distance from a known reference (e.g., an exposed nail head) and a linear extension or enhancement of laser line 715. The user can use the free other hand (not shown) to mark the spot or drill a hole or otherwise operate on the located position. Thus the user 720 can conveniently operate in wall region 718 while having the ability to recapture the apparently vanished laser line 715 in that region and having the ability to simultaneously and with one hand (720) perform another function such as locating a stud (719) and/or measuring a distance (771) relative to a known reference position while leaving the other hand free to mark the position or drill a hole (e.g., using a battery powered, portable hand drill).

While a number of light bending structures and methods have been described above, these are to be seen as nonlimiting examples. Aside from, conventional lenses, fresnel lenses, prisms and mirrors, the light bending structures may alternatively or additionally include one or more of diffraction gratings and holographic optical redirecting means. FIG. 8 is a cross sectional top view showing an environment 800 containing a fourth embodiment 850 of a projection enhancer in accordance with the invention. As in the case of FIG. 6, item 801 can represent a top cross sectional view of a vertical wall having nonplanar deformities such as bump 802. Item 857 represents a substantially flat support having an aperture through which the enhanced line image 823 is directed toward the wall surface 801 for back reflection to the user's eyes (not shown). Each of elements 851a and 851b is a light bending prism (e.g., made of acrylic or another optically functional material which is substantially transparent or colored to provide a desired bandpass function). In one set of embodiments, the cross sectional structure of each prism defines an equilateral triangle as shown having an apex angle in the range of about 25 degrees to about 45 degrees, with one subset having an apex angle of about 35 degrees. The sharp tips of the triangular prisms 851a–851b may be capped with soft, resilient safety caps 859 as shown. In one further set of embodiments, caps 859 are integral parts of a ceiling shroud (like 359 of FIG. 3) which is not shown because it is disposed above the illustrated cross-sectional plane to provide shading from overhead ceiling lights (e.g., 309 of FIG. 3). The shroud my further include a bottom portion for blocking out interfering light rays coming from the direction of the floor where the ceiling portion and floor portions of the shroud are joined by elongated caps 859. Caps 859 may be attached to the triangular prisms 851a–851b by adhesive or other appropriate means.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A projection enhancing method for causing or enhancing projection of a line image onto a work-surface, where the line image appears to dim or disappear from the work-surface in one or more regions of the work-surface and where the line image results at least in part from output of a fan-out of light rays adjacent to the work-surface and from intersection of a first part of the fan-out with the work-surface, the method comprising:
(a) intercepting a second part of the fan-out adjacent to a given work-surface region where the line image appears comparatively dim or appears to have vanished; and
(b) redirecting radiant energy from the intercepted second part of the fan-out to intersect with a reflective surface in the given work-surface region and to thereby cause the line image to appear as having been enhanced in intensity in the given work-surface region or as having been created in the given work-surface region.

2. The projection enhancing method of claim 1 wherein:
(b.1) said redirecting includes refracting the radiant energy.

3. The projection enhancing method of claim 1 wherein:
(b.1) said redirecting includes reflecting the radiant energy.

4. The projection enhancing method of claim 1 wherein:
(b.1) said reflective surface in the given work-surface region is an integral part of the given work-surface region.

5. The projection enhancing method of claim 1 and further comprising:
(c) removably disposing a reflective structure in the given work-surface region to thereby define the reflective surface of the given work-surface region so that the reflective structure can be easily moved away to expose the given work-surface region after the appearance of the line image is enhanced in intensity or created on the removably disposed, reflective structure.

6. The projection enhancing method of claim 5 wherein:
(b.1) said removably disposed, reflective structure includes an optical bandpass filter adapted to pass through radiant energy having one or more wavelengths of the fan-out of light rays output adjacent to the work-surface.

7. The projection enhancing method of claim 5 wherein:
(b.1) said removably disposed, reflective structure includes one or more optical concentrators adapted to concentrate the redirected radiant energy so that a user can receive concentrated amounts of the redirected radiant energy that reflects from the reflective structure.

8. The projection enhancing method of claim 1 wherein:
(a.1) said intercepted second part of the fan-out includes light rays that extend at a distance of at least ¼ inch apart from the given work-surface region where the line image is comparatively dim or appears to have vanished.

9. The projection enhancing method of claim 1 and further comprising:
(c) coupling a first hand tool to a projection enhancing means that performs said intercepting and said redirecting so that the coupled combination of the first hand tool and the projection enhancing means can be easily moved together with the use of just a single hand.

10. The projection enhancing method of claim 9 and further comprising:
(d) using a single hand to move the coupled combination of the first hand tool and the projection enhancing means.

11. The projection enhancing method of claim 10 and further comprising:
(e) using another hand to operate on a work-surface position whose location is determined with the aid of the first hand tool and the projection enhancing means.

12. The projection enhancing method of claim 11 wherein said another hand operates a second hand tool.

13. The projection enhancing method of claim 9 wherein said first hand tool includes a scanner that can detect objects hidden by the work-surface.

14. The projection enhancing method of claim 9 wherein said first hand tool includes a ruler.

15. A method for locating in a given first work-surface region a position that is in-line with a projected light line or a position that is spaced away from a linear extension of the projected light line where the projected light line is relatively bright in a second work-surface region spaced away from said given first work-surface region and the projected light line is relatively dim or apparently vanished in the given first work-surface region, the locating method comprising:
(a) moving a projection enhancer about in the given first work-surface region until an intensity-enhanced version of the relatively dim projected light line is observed or until a resurrected linear extension of the vanished projected light line is observed; and
(b) identifying a desired position that is spaced away from the observed enhancement or linear extension by a predetermined distance or is on the observed enhancement or linear extension.

16. The locating method of claim 15 and further comprising:
(b) marking a mark or making a hole at the identified and desired position.

17. A combination of a line projector and a projection enhancing device operatively coupled with the projector for causing or enhancing projection, from the line projector and onto a work-surface, of a luminous line image, where the line image can appear to dim or disappear from the work-surface in one or more regions of the work-surface and where the line image results at least in part from output from the projector of a fan-out of light rays adjacent to the work-surface and from intersection of a first part of the fan-out with the work-surface, the combination being further characterized by the projection enhancing device comprising:
(a) a fan-out interceptor and redirector structured to intercept a second part of the fan-out adjacent to a given work-surface region where the line image appears to be comparatively dim or appears to have vanished, where the intercepted second part, as originally output and without redirecting by said interceptor and redirector, would not have intersected with the given work-surface region, the fan-out interceptor and redirector being structured to redirect radiant energy from the intercepted second part of the fan-out to intersect in image-enhancing form with a reflective surface in the given work-surface region and to thereby cause the line image to appear as having been enhanced in intensity in the given work-surface region or as having been created in the given work-surface region.

18. The combination of claim 17 wherein the fan-out interceptor and redirector includes:
(a.1) refractive optics disposed to refract the radiant energy from the intercepted second part.

19. The combination of claim 17 wherein the fan-out interceptor and redirector includes:
(a.1) reflective optics disposed to reflect the radiant energy from the intercepted second part.

20. The combination of claim 17 wherein the fan-out interceptor and redirector includes:
(a.1) fresnel optics disposed to refract and/or reflect the radiant energy from the intercepted second part.

21. The combination of claim 17 and further comprising:
(b) a supporting base structured to support the fan-out interceptor and redirector relative to the given work-surface region so that the fan-out interceptor and redirector intercepts the second part of the fan-out at least to a predetermined height spaced away from the given work-surface region.

22. The combination of claim 21 wherein:
(b.1) said predetermined height is at least 0.25 inch.

23. The combination of claim 17 and further comprising:
(b) an optical bandpass filter adapted to pass through radiant energy having one or more wavelengths of the fan-out of light rays output adjacent to the work-surface.

24. The combination of claim 17 and further comprising:
(b) a shroud mechanically coupled to the fan-out interceptor and redirector, and disposed to reduce or block ambient light which can interfere with observation of the enhanced or resurrected line image, where the interference by the ambient light would occur if the shroud were not so disposed.

25. A combination comprising:
(a) a hand tool; and
(b) a projection enhancing device operatively coupled to the hand tool so as to be moved with the hand tool, the hand tool and projection enhancing device being integrally movable relative to a fan-out of light rays that projects a luminous line image onto a work-surface, the projection enhancing device being adapted to enhance projection of the line image onto the work-surface, where the line image can dim or disappear from the work-surface in one or more regions of the work-surface and where the line image results from said fan-out of light rays onto the work-surface and from intersection of a first part of the fan-out with the work-surface, the projection enhancing device including:
(b.1) a fan-out interceptor and redirector structured to intercept a second part of the fan-out adjacent to a given work-surface region where the line image is comparatively dim or appears to have vanished, where the intercepted second part, as originally output, does not originally intersect with the given work-surface region, the fan-out interceptor and redirector being further structured to redirect radiant energy from the intercepted second part of the fan-out to intersect with a reflective surface in the given work-surface region and to thereby cause the line image to appear as having been enhanced in intensity in the given work-surface region or as having been created in the given work-surface region.

26. The combination of claim 25 wherein:
(a.1) the hand tool includes a scanner that can detect objects hidden by the work-surface.

27. The combination of claim 25 wherein:
(a.1) the hand tool includes a ruler.

28. The combination of claim 25 wherein:
(a.1) the operative coupling between the hand tool and the projection enhancing device includes a detachable attachment coupling.

29. The combination of claim 25 wherein:
(a.1) the operative coupling between the hand tool and the projection enhancing device includes a slidable attachment coupling allowing the projection enhancing device to be used for enhancing the line image while slidably coupled to the hand tool.

30. The combination of claim 25 wherein:
(a.1) the operative coupling between the hand tool and the projection enhancing device includes a pivoting attachment coupling.

31. The combination of claim 25 wherein:
the hand tool generates a second luminous line crossing with the enhanced line or created line image formed by the fan-out interceptor and redirector.

32. The combination of claim 31 wherein:
the hand tool selectively generates the second luminous line in response to detection of a hidden wall feature.

33. The combination of claim 32 wherein:
the second luminous line is aligned with a location of the hidden wall feature.

34. A combination of a pattern projector and a pattern redirector wherein:
(a) the pattern projector projects a first fanout of light rays of different intensities to thereby define a projected pattern onto an intersecting and substantially planar wall, where said projected pattern reflects back from the wall to an observer as an on-wall image containing a continuous or another form of a luminous straight line;
(b) the observed luminous line has an apparent first end or first discontinuity at a corresponding first wall position when projected onto the wall without aid of the pattern redirector; and
(c) the pattern redirector is positioned in spaced apart relation to the pattern projector so as to intercept a second fanout of light rays projected from the projector, where said second fanout would not have struck said substantially planar wall at said first wall position without aid of the pattern redirector, and the pattern redirector redirects the intercepted second fanout of light rays so as to cause the intercepted and redirected second fanout to strike the first wall position and then reflect back to the observer as an extension or fill-in or enhancement of the straight line defined by the first fanout.

35. The combination of claim 34 wherein:
the pattern redirector includes two opposed refractors arranged such that said second fanout strikes the wall between the two opposed refractors and reflects back to the observer as an extension or fill-in or enhancement of the straight line defined by the first fanout irrespective of whether the on-wall image of a continuous or other form of straight line appears to one side or the other of the space between the two opposed refractors.

36. A pattern redirector for use with a spaced apart and independently movable projector of a luminous line where the projector outputs a first fanout of light rays of different intensities for intersection with a reflective and substantially planar surface and for reflection back to an observer as an on-surface image of a continuous or other form of straight line formed on the planar surface, and
where the projector outputs a second fanout of light rays in line with the first fanout, but where the second fanout does not strike the reflective and substantially planar surface at a sufficient angle or at all for providing sufficient reflection back to the observer as an image of a continuation of said continuous or other form of straight line formed on the planar surface,
the pattern redirector comprising:
(a) two opposed refractors each arranged to intercept the second fanout of light rays if the second fanout reaches that refractor first, and to redirect the intercepted second fanout of light rays so as to cause the intercepted second fanout to strike the reflective surface in a space between the two opposed refractors and then reflect back to the observer as an extension or fill-in or enhancement of the on-surface straight line defined by the first fanout.

37. The pattern redirector of claim 36 and further comprising:
(b) a support means supporting the two opposed refractors in symmetrical opposition to one another.

38. The pattern redirector of claim 37 wherein:
(b.1) said support means includes a base plate.

39. The pattern redirector of claim 38 wherein:
(b.2) said base plate has an elongated first aperture defined therethrough for allowing the intercepted second fanout to pass through the first aperture and thereby strike the reflective surface in the space between the two opposed refractors.

40. The pattern redirector of claim 39 wherein:
(b.3) said base plate has a circular second aperture defined therethrough and spaced apart from the first aperture by a predefined distance.

41. The pattern redirector of claim 38 wherein:
(b.1) said base plate has a red filter plate.

42. The pattern redirector of claim 38 wherein:
(b.1) said base plate includes a transparent section for viewing a surface below the base plate.

43. The pattern redirector of claim 37 wherein:
(a.1) each of said two opposed refractors is colored red or is attached to a red filter.

44. The pattern redirector of claim 37 and further comprising:
(c) a shroud extending between or adjacent to the two opposed refractors and spaced from the space between the two opposed refractors where the second fanout will strike so as to thereby shade the space between the two opposed refractors from interfering external light.

45. The pattern redirector of claim 37 wherein:
(b.1) said support means comprises a hand held tool movable in unison with said two refractors and independently of the projector.

46. The pattern redirector of claim 45 wherein:
(b.2) said hand held tool generates a second luminous line crossing with the line extension or fill-in or enhancement formed by one of the two opposed refractors.

47. The pattern redirector of claim 46 wherein:
the hand held tool generates the second luminous line in response to detection of a hidden wall feature.

48. The pattern redirector of claim 47 wherein:
the second luminous line is aligned with a location of the hidden wall feature.

49. A line extender/enhancer for use with a spaced apart and independently movable projector of a luminous line where the projector outputs a first fanout of light rays of different intensities for intersection with a reflective and substantially planar surface and for reflection back to an observer as an image of a continuous or other form of straight line formed on the planar surface, and
where the projector outputs a second fanout of light rays in line with the first fanout, but where the second fanout does not strike the reflective and substantially planar surface at a sufficient angle or at all for providing sufficient reflection back to the observer as an image of a continuation of said continuous or other form of straight line formed on the planar surface,
the line extender/enhancer comprising:
(a) an array of refractors and an array of mirrors arranged in opposition to one another such that the array of refractors intercepts the second fanout of light rays and redirects a first portion of the intercepted second fanout of light rays so as to cause the first portion to strike the reflective surface in a space between the two opposed arrays and then reflect back to the observer as an extension or fill-in or enhancement of the straight line defined by the first portion, and
such that the array of refractors directs a second portion of the intercepted second fanout of light rays to the opposed array of mirrors and the array of mirrors redirect the refractor-directed second portion to strike the reflective surface in the space between the two opposed arrays and then reflect back to the observer as an enhancement of said extension or fill-in or enhancement of the straight line.

50. A hand tool that is functionally usable by a single hand, the tool having a projection enhancer mounted thereto, the enhancer being operative while mounted to the hand tool such that the hand tool and projection enhancer are integrally movable relative to an externally generated fan-out of light rays that projects a luminous line image towards a first part of a selected work-surface, where the projection enhancer is oriented or orientable while mounted to the hand tool to contribute in a projection of a line image onto a second part of the work-surface while the hand tool is providing one or more predefined tool functions for the second work-surface part, where without said contribution by the enhancer; the line image would appear dim in, or vanished from, the second work-surface part and where the line image appears in an enhanced or visible form on the second work-surface part as a result of the enhancer intercepting a part of the light fan-out adjacent to the second work-surface part and due to the orientation of the mounted enhancer causing the enhancer to redirect radiant energy from the intercepted part of the fan-out so that the redirected energy intersects with and reflects off the second work-surface part thereby causing the line image to appear as having been enhanced in intensity in the second work-surface part or as having been created in the second work-surface part.

51. The hand tool of claim 50 where said one or more predefined tool functions of the hand tool includes a scanning function that detects hidden features of the work-surface.

52. The hand tool of claim 51 where said scanning function of the hand tool includes a stud finding function.

53. The hand tool of claim 50 where said one or more predefined tool functions of the hand tool include one or more sensing functions.

54. The hand tool of claim 53 where said one or more sensing functions are selected from the group consisting of locating a surface-hidden metal object and locating a -surface-hidden electrical line.

55. The hand tool of claim 50 where said one or more predefined tool functions of the hand tool includes measuring a distance.

56. The hand tool of claim 50 where said one or more predefined tool functions of the hand tool includes a secondary line projecting function that projects a second luminous line crossing with the enhanced or created line image contributed to by the enhancer.

57. The hand tool of claim 50 where said mounting of the enhancer is provided by the enhancer being fixedly attached to the hand tool.

58. The hand tool of claim 50 where said mounting of the enhancer is provided by the enhancer being removably clipped into a body portion of the hand tool.

59. The hand tool of claim 50 where said mounting of the enhancer is provided by the enhancer being slideably extendable out of a body portion of the hand tool.

60. The hand tool of claim 50 where said mounting of the enhancer is provided by the enhancer being pivotally attached to the hand tool such that pivoting of the enhancer via the pivotal attachment brings the enhancer into said orientation for enhancing or creating the line image.

61. The hand tool of claim 50 where the enhancer includes both a refractive element and a reflective element.

62. The hand tool of claim 61 where said refractive and reflective elements are part of an interdigitated array of refractive and reflective elements.

63. The hand tool of claim 50 where the enhancer includes a reflective element.

64. The hand tool of claim 50 where the enhancer includes a refractive element.

65. The hand tool of claim 64 where the refractive element is red colored or has a red filter operatively coupled thereto.

* * * * *